United States Patent [19]

Kurihara

[11] Patent Number: 4,851,118

[45] Date of Patent: Jul. 25, 1989

[54] FUEL FILTER FOR MOTOR VEHICLE

[75] Inventor: Kazumasa Kurihara, Utsunomiya, Japan

[73] Assignee: Nifco, Inc., Yokohama, Japan

[21] Appl. No.: 189,911

[22] Filed: May 3, 1988

[30] Foreign Application Priority Data

May 15, 1987 [JP] Japan .............................. 62-72630[U]

[51] Int. Cl.⁴ ............................................ B01D 27/08
[52] U.S. Cl. ................................. 210/315; 210/323.2; 210/416.4; 210/485; 210/484
[58] Field of Search .................. 210/315, 323.2, 416.4, 210/461, 484, 485

[56] References Cited

U.S. PATENT DOCUMENTS

| | | | |
|---|---|---|---|
| 3,900,397 | 8/1975 | Bell | 210/416.4 X |
| 4,358,372 | 11/1982 | Lundquist | 210/315 X |
| 4,539,107 | 9/1985 | Ayers | 210/416.4 X |
| 4,617,121 | 10/1986 | Yokoyama | 210/416.4 |
| 4,640,771 | 2/1987 | Whalen | 210/167 |
| 4,645,600 | 2/1987 | Filippi | 210/416.4 |

Primary Examiner—Charles Hart
Attorney, Agent, or Firm—Schwartz & Weinrieb

[57] ABSTRACT

A fuel filter for installation within a fuel tank comprises a main filter element for removing foreign matter and an auxiliary filter element consisting of a metal net covering the main filter element. The metal auxiliary filter element protects the main filter element against any spattering or molten metal that may occur during assembly of the fuel tank by means of a welding process of the like.

20 Claims, 2 Drawing Sheets 4,851,118

FUEL FILTER FOR MOTOR VEHICLE

BACKGROUND OF THE INVENTION

1. Field of the Invention

This invention relates to a filter used as a fuel filter within a motor vehicle.

2. Description of the Prior Art

A motor vehicle fuel tank is usually provided with a fuel filter for removing foreign matter, for example, water and dust particles, from the fuel.

The fuel filter is usually formed from cloth or made of a synthetic resin so as to have a mesh-like form, and can reliably remove foreign matter such as water and dust particles from the fuel.

The fuel filter is disposed within a fuel tank as noted above. In such case, the fuel filter is normally mounted within the fuel tank before the assembling thereof, and it is disposed within the fuel tank when the fuel tank is assembled.

The fuel tank normally consists of upper and lower panels, and is assembled by welding these two panels together. Therefore, in the operation of assembling the fuel tank, the fuel filter is liable to be burned or otherwise damaged by means of spattered molten metal during the welding operation.

OBJECT OF THE INVENTION

The invention hs been made in light of the above facts, and its object is to provide a fuel filter for a motor vehicle, which is safe from damage by means of any spattering of molten metal or the like which may occur during the welding process.

SUMMARY OF THE INVENTION

In order to attain the above object of the invention, there is provided a fuel filter which comprises a main filter element for removing foreign matter and an auxiliary filter element consisting of a metal net covering the main filter element.

In accordance with the fuel filter of the above construction, in which the main filter element is covered by means of the auxiliary filter element, the metal auxiliary filter element provides shielding against any spattering of molten metal or the like which may occur during the welding process. The main filter element is thus reliably protected against spattering of the molten metal or the like so that it will not be damaged thereby.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 3:
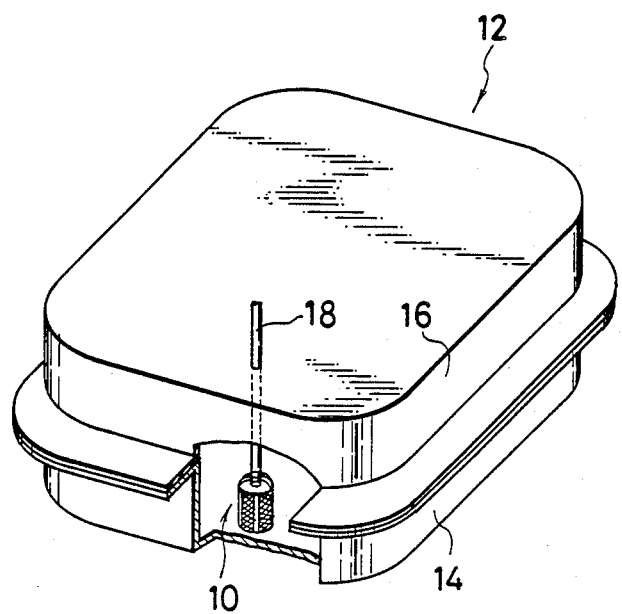
FIG. 3 is a perspective view showing the fuel filter of FIG. 1 mounted within an assembled fuel tank.

The drawings illustrate an embodiment of the fuel filter for a motor vehicle fuel tank according to the invention. In the embodiment, as shown in FIG. 3, a fuel filter 10 is disposed within a fuel tank 12. Fuel within the fuel tank 12 is filtered through means of the fuel filter 10 for removal of foreign matter, such as, for example, water and dust particles, before being withdrawn through a fuel pipe 18. The fuel tank 12 consists of a lower panel 14 and an upper panel 16 welded thereto. The fuel filter 10 is mounted upon the upper panel 16 together with the fuel pipe 18 before assembly of the fuel tank 12, that is, before the welding of the lower panel 14 to the upper panel 16. The fuel pipe 18 is inserted through and secured to the upper panel 16. The fuel filter 10 is fitted upon an end of the fuel pipe 18 and then mounted below the upper panel 16. When the upper panel 16 is subsequently welded to the lower panel 14, the fuel filter 10 is disposed between the upper and lower panels 16 and 14.

Figure 2:
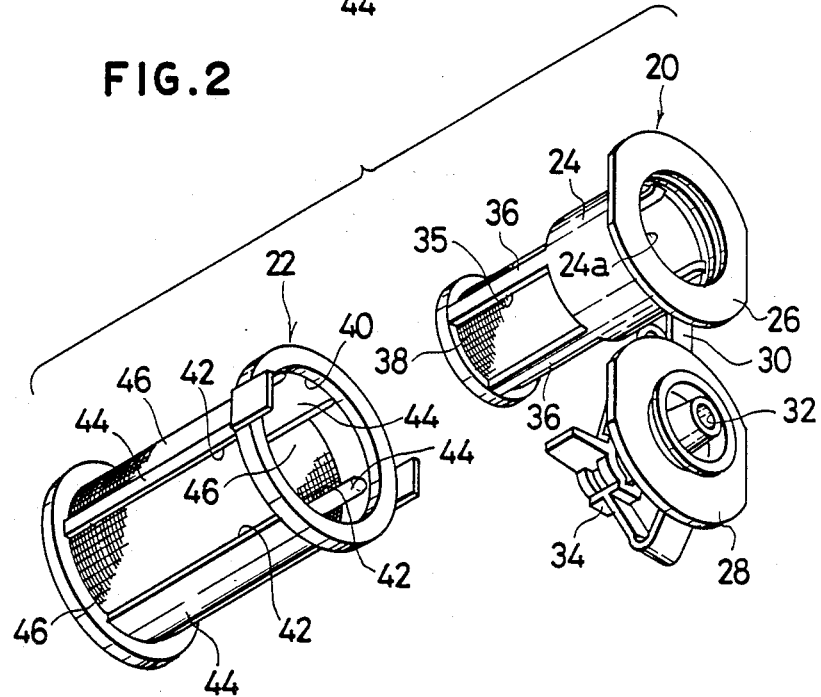
FIG. 2 is an exploded perspective view showing the filter shown in FIG. 1.

As shown in FIG. 2, the fuel filter 10 consists of an inner filter member or assembly 20 and an outer filter member or assembly 22.

The inner member 20 has a substantially cylindrical body portion 24 and a mounting portion 28, and consists of a one-piece molding of a synthetic resin. The body portion 24 has an opening 24a at one end which extends in the axial direction thereof. It has an outer flange 26 surrounding the opening 24a, and the mounting portion 28 is united to the flange 26. The lower surface of the flange 26 has an annular raised portion 26a (see FIG. 1), thus partly increasing the outer diameter of the body portion 24. The mounting portion 28 is united to flange portion 26 by means of a reduced thickness portion 30. It is inserted through the opening 24a of the body portion 24 so as to be affixed to the same by deforming or folding the reduced thickness portion 30. The mounting portion 28 has a through hole 32 defined within an axial sleeve member through which the fuel pipe 18 is to be inserted, and a holding portion 34 which is coaxial with the through hole 32 and through which the fuel pipe 18 can also be inserted, the through hole 32 and holding portion 34 being used for mounting the fuel filter upon the fuel pipe 18.

The body portion 24 of the inner member 20 has a plurality of circumferentially arranged openings 35 defined by means of ribs 36, and a main filter element 38 is installed within the openings 35. The main filter element 38 consists of a nylon net having excellent water separation and fuel withdrawal performance characteristics.

The outer member 22 is a substantially cylindrical one-piece molding of a synthetic resin and can accommodate the inner member 20. The outer member 22 has an opening 40 defined within one end thereof and extending in the axial direction. The raised or flanged portion 26a of the inner member 20 is press fitted within the opening 40, so that the outer member 22 is affixed to the inner member 20 with the body portion 24 of the inner member 20 acommodated within the outer member 22.

The outer member 22 has a plurality of circumferentially arranged openings 42 defined by means of ribs 44. The openings 42 extend substantially over the entire length of the outer member 22. Each opening 42 has a greater area than each opening 35 of the inner member 20. An auxiliary filter element 46 is installed within the openings 42. The auxiliary filter element 46 is a stainless steel net and has excellent fuel withdrawal performance characteristics.

Figure 1:
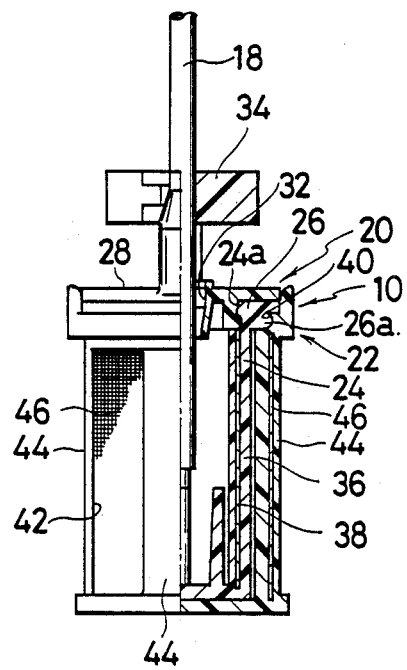
FIG. 1 is a side view, partly in section, showing an embodiment of the fuel filter according to the invention.

With the fuel filter 10 having the above construction, as shown in FIG. 1, the inner member 20 is assembled with the mounting portion 28 mounted within the body portion 24. The outer member 22 is assembled upon the inner member 20 with the raised or flanged portion 26a of the inner member 20 press fitted within the opening 40 of the outer member 22 and the body portion 24 of the inner member 20 disposed within outer member 22. The fuel filter 10 is mounted upon the fuel pipe 18 with the fuel pipe 18 inserted through the holding portion 34 of the inner member 20 and the through hole 32 of the sleeve of the mounting portion 28 into the inner member 20.

With the construction as described above, in which the main filter element 38 is covered by means of the auxiliary filter element 46, the auxiliary filter element 46 reliably protects the main filter 38 against any spattering of molten metal or the like which may occur during assembling of the fuel tank 12, that is, during welding of the upper panel 16 to the lower panel 14. Furthermore, the auxiliary filter element 46 is maintained safe from being burned or damaged by means of spattered molten metal or the like because it is made of stainless steel.

Thus, the fuel filter 10 can be disposed within the fuel tank 12 without being damaged when the fuel tank 12 is assembled.

Furthermore, since the fuel filtering area of the auxiliary filter element 46 of the fuel filter 10 is larger than the fuel filtering area of the main filter element 38, substantially no fuel withdrawal pressure loss is generated as a result of the installation of the auxiliary filter element 46 about the primary or main filter element 38.

Still further, since the fuel filter 10 is characterized by having the mounting portion 28 to be mounted upon the fuel pipe 18 integral with the inner member 20, the number of components is reduced so as to reduce the manufacturing cost thereof.

As has been described in the foregoing, the fuel filter comprises a main filter element for removing foreign matter and an auxiliary filter element consisting of a metal net covering the main filter element, so that the latter will not be damaged due to spattering of molten metal or the like during a welding operation of the assembly process of the fuel tank.

Obviously, many modifications and variations of the present invention are possible in light of the above teachings. It is therefore to be understood that within the scope of the appended claims, the present invention may be practiced otherwise than as specifically described herein.

What is claimed is:

1. A fuel filter for a motor vehicle, comprising:
a main filter element comprising a filter material for removing foreign matter; and
an auxiliary filter element, comprising a metal net surrounding said main filter element for protecting said main filter element,
said auxiliary filter element further comprising a cylindrical tube, closed at one end and open at the other end, for housing said main filter element therewithin; and
said main filter element further comprising a cylindrical tube closed at one end and open at the other end for receiving a fuel pipe therewithin, flange means mounted upon said open end of said main filter element for mating engagement with said open end of said auxiliary filter element so as to mount said main filter element within said auxiliary filter element, means for supporting said fuel pipe with respect to said main filter element, and means operatively connected to said fuel pipe supporting means and mounted within said open end of said main filter element for mounting said fuel pipe supporting means at an axial position remote from said open end of said main filter element.

2. The fuel filter according to claim 1, wherein said auxiliary filter element is made of stainless steel.

3. The fuel filter according to claim 1, wherein the fuel filtering area of said auxiliary filter element is larger than the fuel filtering area of said main filter element.

4. The fuel filter according to claim 2, wherein the fuel filtering area of said auxiliary filter element is larger than the fuel filtering area of said main filter element.

5. The fuel filter as set forth in claim 1, wherein:
said main filter element is fabricated from a synthetic plastic resin.

6. The fuel filter as set forth in claim 5, wherein:
said main filter element comprises a nylon net.

7. The fuel filter as set forth in claim 1, wherein:
said auxiliary filter element comprises a cylindrical cage having said metal net disposed interiorly within said cylindrical cage.

8. The fuel filter as set forth in claim 6, wherein:
said main filter element comprises a cylindrical cage having said nylon net disposed interiorly within said cylindrical cage.

9. The fuel filter as set forth in claim 8, wherein:
said cylindrical cage, said flange means, said fuel pipe supporting means, and said mounting means of said main filter element are integrally formed together as a one-piece synthetic resin molding component.

10. The fuel filter as set forth in claim 1, further comprising:
sleeve means integrally formed with said mounting means of said main filter element for supporting said fuel pipe within said main filter element at an axial position substantially corresponding with said open end of said main filter element.

11. A fuel filter for a motor vehicle, comprising:
a main filter element for removing foreign matter from said fuel; and
an auxiliary filter element surrounding said main filter element for protecting said main filter element;
said auxiliary filter element comprising a cylindrical cage closed at one end and open at the other end for receiving said main filter element therewithin; longitudinally extending, circumferentially spaced ribs interconnecting said one and other ends and defining circumferentially spaced openings between successive circumferentially spaced ribs; and a filter net disposed interiorly of said cylindrical cage ribs for covering said circumferentially spaced openings; and
said main filter element comprising a cylindrical cage closed at one end thereof and open at the other end thereof; longitudinally extending, circumferentially spaced ribs interconnecting said one and other ends and defining circumferentially spaced openings between successive circumferentially spaced ribs; a filter net disposed interiorly of said cylindrical cage ribs for covering said circumferentially spaced openings, the fuel filtering area of said main filter element being less than that of said auxiliary filter element so as to substantially prevent any fuel withdrawal pressure loss; and flange means integrally connected to said open end of said cylindrical cage of said main filter for mounting said main filter element within said open end of said auxiliary filter element and for mounting said fuel filter upon a fuel pipe.

12. A fuel filter as set forth in claim 1, wherein: said auxiliary filter element net comprises stainless steel.

13. A fuel filter as set forth in claim 11, wherein: said main filter element net comprises nylon.

14. A fuel filter as set forth in claim 11, wherein: said cylindrical cage and said flange means of said main filter element comprises a one-piece synthetic resin molding.

15. A fuel filter as set forth in claim 11, wherein: said cylindrical cage of said auxiliary filter element, comprising said end portions and said longitudinally extending ribs, comprises a one-piece synthetic resin molding.

16. A fuel filter as set forth in claim 11, wherein said flange means of said main filter element comprises:
a flanged portion integrally formed upon said open end of said cylindrical cage; and
an axially extending sleeve coaxially mounted upon said flanged portion for supporting said fuel pipe relative to said fuel filter.

17. A fuel filter as set forth in claim 16, further comprising:
flexible web means integrally interconnecting said flanged portion and said axially extending sleeve for permitting said axially extending sleeve to be coaxially aligned with said flanged portion as a result of said flexible web means being folded over upon itself.

18. A fuel filter as set forth in claim 16, further comprising:
holding means integrally formed within said axially extending sleeve for supporting said fuel pipe relative to said fuel filter at an axial position remote from said flanged portion.

19. A fuel filter as set forth in claim 17, wherein: said cylindrical cage, said flanged portion, said axially extending sleeve, and said flexible web means are formed as a one-piece synthetic resin molding.

20. A fuel filter as set forth in claim 19, wherein: said main filter element net comprises nylon.

* * * * *